United States Patent
Shida

(10) Patent No.: US 9,710,301 B2
(45) Date of Patent: Jul. 18, 2017

(54) STORAGE MEDIUM STORING COMPUTER PROGRAM, INFORMATION PROCESSING SYSTEM, AND INFORMATION PROCESSING METHOD

(71) Applicant: ALPINE ELECTRONICS, INC., Shinagawa-ku, Tokyo (JP)

(72) Inventor: Muneyuki Shida, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 34 days.

(21) Appl. No.: 14/639,751

(22) Filed: Mar. 5, 2015

(65) Prior Publication Data

US 2015/0293782 A1 Oct. 15, 2015

(30) Foreign Application Priority Data

Apr. 9, 2014 (JP) .................. 2014-080125

(51) Int. Cl.
| | | |
|---|---|---|
| G06F 3/00 | (2006.01) | |
| G06F 9/44 | (2006.01) | |
| G06F 9/46 | (2006.01) | |
| G06F 13/00 | (2006.01) | |
| G06F 9/48 | (2006.01) | |

(52) U.S. Cl.
CPC .................. *G06F 9/485* (2013.01)

(58) Field of Classification Search
None
See application file for complete search history.

(56) References Cited

U.S. PATENT DOCUMENTS

| | | | | |
|---|---|---|---|---|
| 6,201,794 B1* | 3/2001 | Stewart | .................. | H04L 45/02 370/248 |
| 7,293,145 B1* | 11/2007 | Baird | .................. | G06F 11/1471 711/162 |
| 8,645,736 B1* | 2/2014 | Tabone | ................. | G06F 9/4418 713/300 |
| 2002/0107966 A1* | 8/2002 | Baudot | .................. | H04L 69/40 709/227 |
| 2011/0249668 A1* | 10/2011 | Van Milligan | .......... | G06F 9/485 370/352 |
| 2012/0173792 A1* | 7/2012 | Lassa | .................... | G06F 9/4843 711/103 |
| 2014/0310724 A1* | 10/2014 | Chan | ................... | G06F 11/3688 719/313 |

FOREIGN PATENT DOCUMENTS

JP  2006-209560  8/2006

* cited by examiner

*Primary Examiner* — Tuan Dao
*Assistant Examiner* — William C Wood
(74) *Attorney, Agent, or Firm* — Brinks Gilson & Lione

(57) ABSTRACT

A computer program, an information processing system, and an information processing method are capable of properly managing the connection state of communication connection with an external device. When an operating system shifts an application to a background state, the operating system provides the application with a background shift notification. In the case where communication connection, targeted for management, between the application and an external accessory system is in an active state, the application having received the background shift notification cuts off, via the operating system, the communication connection established between the application and the accessory system, and switches the state of the communication connection, targeted for management, to an inactive state.

12 Claims, 4 Drawing Sheets

STORAGE MEDIUM STORING COMPUTER PROGRAM, INFORMATION PROCESSING SYSTEM, AND INFORMATION PROCESSING METHOD

RELATED APPLICATION

The present application claims priority to Japanese Patent Application Number 2014-080125, filed Apr. 9, 2014, the entirety of which is hereby incorporated by reference.

BACKGROUND OF THE DISCLOSURE

1. Field of the Invention

The present invention relates to the technique of managing the state of communication with an external device by an application executed on a mobile computer.

2. Description of the Related Art

An operating system configured to execute a plurality of applications while the execution state of each application shifts among a foreground state, a background state, and a suspended state has been known as an operating system for a multitasking mobile computer (see, e.g., Japanese Patent Laid-Open No. 2006-209560).

The foreground state described herein indicates the state in which the application is executed while processing such as display in a window and reception of a user operation is available with a user interface being activated. The background state described herein indicates the state in which the application is executed while the user interface is inactivated. The suspended state described herein indicates the state in which the application is loaded, but the code thereof is inexecutable.

The application to be executed in the foreground state is limited to a single application, and for example, the execution state of each application is controlled as follows by the operating system. That is, depending on, e.g., the user operation, the operating system switches the application targeted for the foreground state. Moreover, when the operating system switches the application targeted for the foreground state, the operating system shifts the execution state of the application having been executed in the foreground state to the background state. In addition, the operating system shifts the execution state of the application, not performing continuous processing in the background state, to the background state, and then shifts the execution state of such an application to the suspended state by a predetermined trigger such as a lapse of a predetermined period of time.

Suppose that the application executed on the operating system configured to shift the execution state of each application among the foreground state, the background state, and the suspended state as described above performs, in the foreground state, processing using a communication connection established between the application and an external device. In this case, the following disadvantage may arise.

That is, even after the application performing processing using the communication connection established between the application and the external device in the foreground state shifts from the foreground state to the background state, the connection state of the communication connection is maintained. Thus, the application continues to manage the connection state of the communication connection as being an active state. Subsequently, when the application shifts from the background state to the suspended state, the application becomes inexecutable in the suspended state, and therefore, the communication connection managed by the application is, during the period of the suspended state, put on hold with the connection state thereof being the active state.

Meanwhile, in shifting the application from the background state to the suspended state, for example, the application substantially enters an inoperable state or becomes inoperable on the external device, and therefore, the communication connection used by the application may be cut off by the external device or the operating system. In this case, after the application shifts from the suspended state to the background state or the foreground state, inconsistency occurs when the application recognizes the connection state of the communication connection as being the active state in spite of the communication connection being cut off. Such inconsistency may lead to erroneous operation of the application.

The present disclosure is intended to use an application shifting among a foreground state, a background state, and a suspended state and performing, in the foreground state, processing using a communication connection established between the application and an external device to properly manage the connection state of the communication connection.

SUMMARY

In order to accomplish the foregoing objective, the present disclosure provides a storage medium storing a computer program read and executed by a computer including an operating system. In the storage medium, the computer causes the computer program to function as an application running on the operating system. Note that while the application is running, the operating system controls and shifts the execution state of the application among a foreground state in which the application is executed in a foreground, a background state in which the application is executed in a background, and a suspended state in which the application is inexecutable. Moreover, the application includes a communication connection-used processor configured to, when the execution state is the foreground state, perform processing using communication connection established between the application and an external device, a communication connection manager configured to save connection state information indicating the active or inactive state of the communication connection and to update the connection state information depending on the change in active or inactive state of the communication connection between the foreground state and the background state, and a communication connection cutter configured to, in the case where the communication connection between the application and the external device is in the active state, cut off the communication connection when the execution state shifts to the background state.

According to the foregoing application by the computer program, when the application shifts to the background state, the communication connection between the application and the external device is surely cut off prior to the shift of the application to the suspended state, and the state of the communication connection indicated by the connection state information is updated during the inactive state of the communication connection. Moreover, since the communication connection already has been cut off when the application shifts to the suspended state, the state of the communication connection between the application and the external device is not changed during the period of the suspended state. Thus, when the application returns from the suspended state to the foreground state, occurrence of inconsistency between the state of the communication connection managed as the connection state information and the actual state of the communication connection is reduced.

In the foregoing storage medium storing the computer program, the application may further include a continuous operation setter configured to selectively set whether or not continuous operation is performed in the background state. When the execution state shifts to the background state, if it is set that the application performs the continuous operation in the background state, the communication connection cutter of the application may not cut off the communication connection even in the case where the communication connection between the application and the external device is in the active state. When the execution state shifts to the background state, only if it is set that the application does not perform the continuous operation in the background state, and the communication connection between the application and the external device is in the active state, the communication connection cutter of the application may cut off the communication connection.

According to the foregoing, the communication connection between the application and the external device can be cut off in the case where there is a possibility that the application shifts to the suspended state so as not to continuously operate in the background state, i.e., the case where there is a possibility that inconsistency between the state of the communication connection managed as the connection state information and the actual state of the communication connection occurs if the communication connection between the application and the external device is not cut off.

In the foregoing computer program, the application may further include a communication connection activator configured to, in the case where the connection state information indicates that the communication connection between the application and the external device is in the inactive state, activate the communication connection between the application and the external device when the execution state shifts to the foreground state.

In order to accomplish the foregoing objective, the present disclosure also provides an information processing system including the application in the storage medium storing the computer program as described above, and a method for performing processing by the application in the storage medium storing the computer program as described above.

As described above, according to the present disclosure, the application shifting among the foreground state, the background state, and the suspended state and performing processing using the communication connection established between the application and the external device in the foreground state can properly manage the connection state of the communication connection.

DESCRIPTION OF THE PREFERRED EMBODIMENTS

An embodiment of the present invention will be described below.

Figure 1:
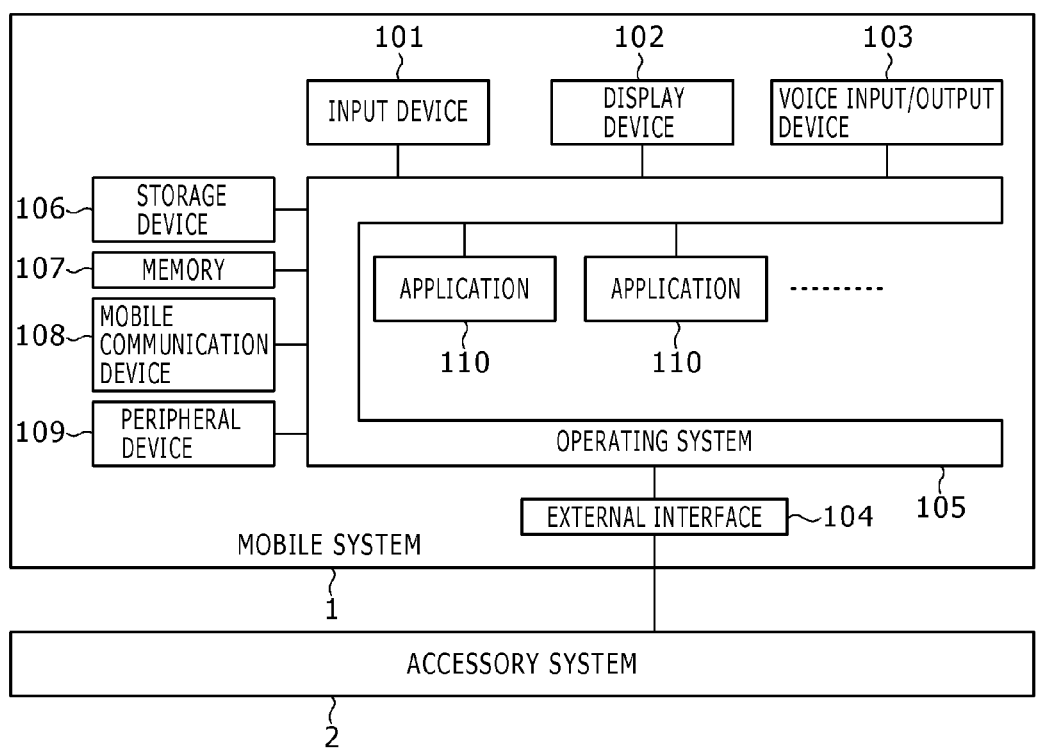
FIG. 1 is a block diagram showing the configuration of a mobile system according to an embodiment of the present invention.

FIG. 1 shows the configuration of a mobile system of the present embodiment. Referring to FIG. 1, a mobile system 1 includes an input device 101, a display device 102, a voice input/output device 103 provided with a microphone, a speaker and the like, an external interface 104 connectable to an external accessory system 2, an operating system 105, a storage device 106 functioning as an external storage device, a memory 107 functioning as a main storage device, a mobile communication device 108 to be connected to a mobile communications network, a peripheral device 109, and various types of applications 110 running on the operating system 105.

The external interface 104 is an interface device to be connected to the external accessory system 2 via a wire communication interface such as USB or a wireless communication interface such as Bluetooth (registered trademark) and Wi-Fi (IEEE 802.11 series).

The mobile system 1 includes, as the applications 110 described above, a mobile phone application providing a mobile phone function using the mobile communication device 108, the voice input/output device 103, and the input device 101, and a remote control application and the like for remote-controlling the accessory system 2 connected to the external interface 104.

Note that the mobile system 1 is a portable system such as a smartphone or a tablet system. The mobile system 1 is, in terms of hardware, configured using a computer including a CPU, the memory 107 and the like. The operating system 105, the applications 110 and the like are implemented in such a manner that the computer executes a predetermined computer program. Each application 110 is executed in such a manner that the computer program of the each application 110 stored in the storage device 106 is loaded into the memory 107 and is executed under control of the operating system 105.

Next, control of execution of the applications 110 by the operating system 105 in the mobile system 1 described above will be described.

The operating system 105 is an operating system 105 configured to control execution of the applications 110 by multitasking, and controls execution of the applications 110 while shifting each application 110 among an inoperable state, a foreground state, a background state, and a suspended state.

The inoperable state indicates the state in which the application 110 is not activated, and the application 110 is not loaded into the memory 107 in the inoperable state. The foreground state indicates the state in which the application 110 loaded into the memory 107 is executed while processing such as display in a window and reception of user operation is available with a user interface being activated. The background state indicates the state in which the application 110 loaded into the memory 107 is executed while the user interface is inactivated. The suspended state indicates the state in which the application 110 is loaded into the memory 107, but the code thereof is inexecutable.

The application 110 to be executed in the foreground state is limited to a single application, and for example, the execution state of each application 110 is controlled as follows by the operating system 105.

Figure 2:
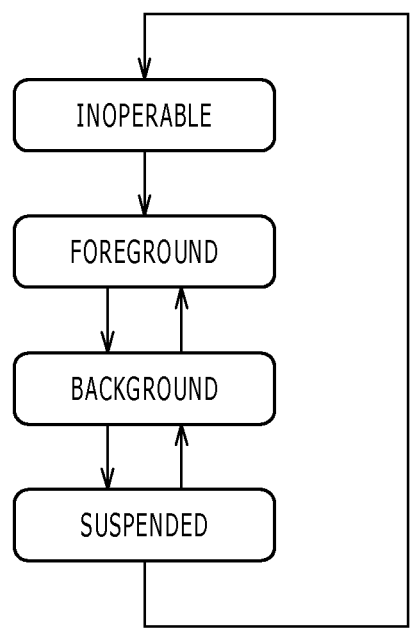
FIG. 2 is a chart showing an example of shifting the state of an application according to the embodiment of the present invention.

That is, referring to FIG. 2, when the application 110 in the inoperable state is activated by a user, the application 110 shifts from the inoperable state to the foreground state, and begins running. When the operating system 105 switches, depending on, e.g., the user operation, the application 110 targeted for the foreground state from the application 110 having been in the foreground state to another application 110 or controls the mobile system 1 to a sleep state, the execution state of the application 110 having been in the foreground state shifts to the background state by the operating system 105. In addition, the operating system 105 shifts the application 110, not performing continuous processing in the background state, to the background state, and then shifts the execution state of such an application 110 to the suspended state by a predetermined trigger such as a lapse of a predetermined period of time. On the other hand, the operating system 105 does not shift the application 110, performing continuous processing in the background state, to the suspended state.

When the mobile system 1 lacks resources such as the memory 107, the operating system 105 switches the application 110, having shifted to the suspended state, to the inoperable state. In this manner, the resources, such as the memory 107, used by the application 110 are freed up.

When the request for switching the application 110 in the suspended state to the foreground state is made by, e.g., a user operation, the operating system 105 switches the application 110 in the suspended state to the background state, and then switches such an application 110 to the foreground state. Note, however, that when the request for switching the application 110 in the suspended state to the foreground state is made by, e.g., the user operation, the operating system 105 may switch the application 110 in the suspended state directly to the foreground state.

Moreover, the operating system 105 shifts the application 110, performing continuous processing in the foreground state, to the background state, and then holds such an application 110 in the background state without shifting the application 110 to the suspended state. When the request for switching the application 110 in the background state to the foreground state is made by, e.g., a user operation, the operating system 105 returns the application 110 in the background state to the foreground state.

The processing of preparing for shift to the background state in the foregoing mobile system 1 will be described below. Such background shift preparation processing is performed by the application 110 which performs, in the foreground state, processing using the communication connection established between the application 110 and the accessory system 2 connected to the external interface 104 and which does not perform continuous processing in the background state when such an application 110 has shifted to the background state.

The background shift preparation processing is the processing performed by the application 110 upon reception of a background shift notification provided from the operating system 105 to the application 110 shifted to the background state. More specifically, the background shift preparation processing is performed by the method of the application 110 invoked by the background shift notification.

Figure 3:
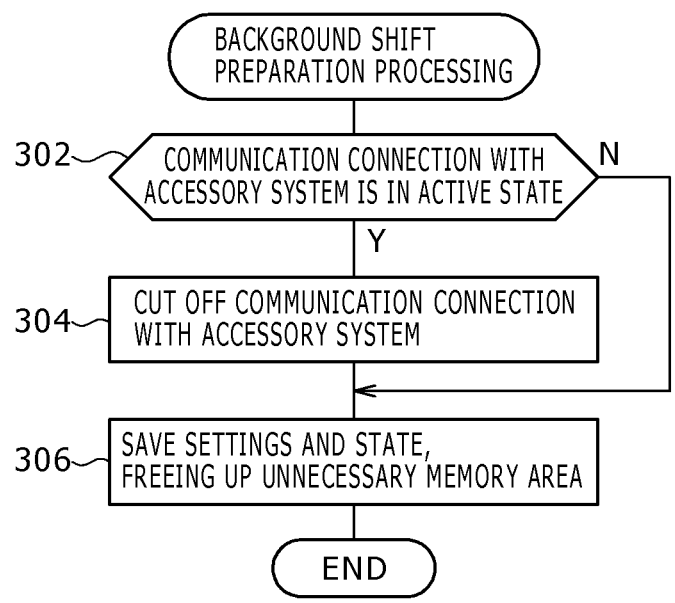
FIG. 3 is a flowchart showing background shift preparation processing according to the embodiment of the present invention.

FIG. 3 shows the steps of the background shift preparation processing performed by the application 110 which does not perform continuous processing in the background state.

As shown in FIG. 3, in this processing, it is first checked whether or not the communication connection between the application 110 and the accessory system 2 is in an active state (step 302). If the communication connection with the accessory system 2 is not in the active state, the processing of preparing for shift to the background state, such as various settings of the application 110, saving of the state of the application 110, and freeing-up of an unused memory area, is performed (step 306), and then the processing is terminated.

On the other hand, if the communication connection with the accessory system 2 is in the active state (step 302), the communication connection with the accessory system 2 is first cut off via the operating system 105 (step 304). Then, the processing of preparing for shift to the background state, such as various settings of the application 110, saving of the state of the application 110, and freeing-up of an unused memory area, is performed (step 306), and then the processing is terminated.

The background shift preparation processing performed by the application 110 has been described above.

An example of the operation of the application 110 performing the foregoing background shift preparation processing will be described below with reference to FIG. 4.

Figure 4:
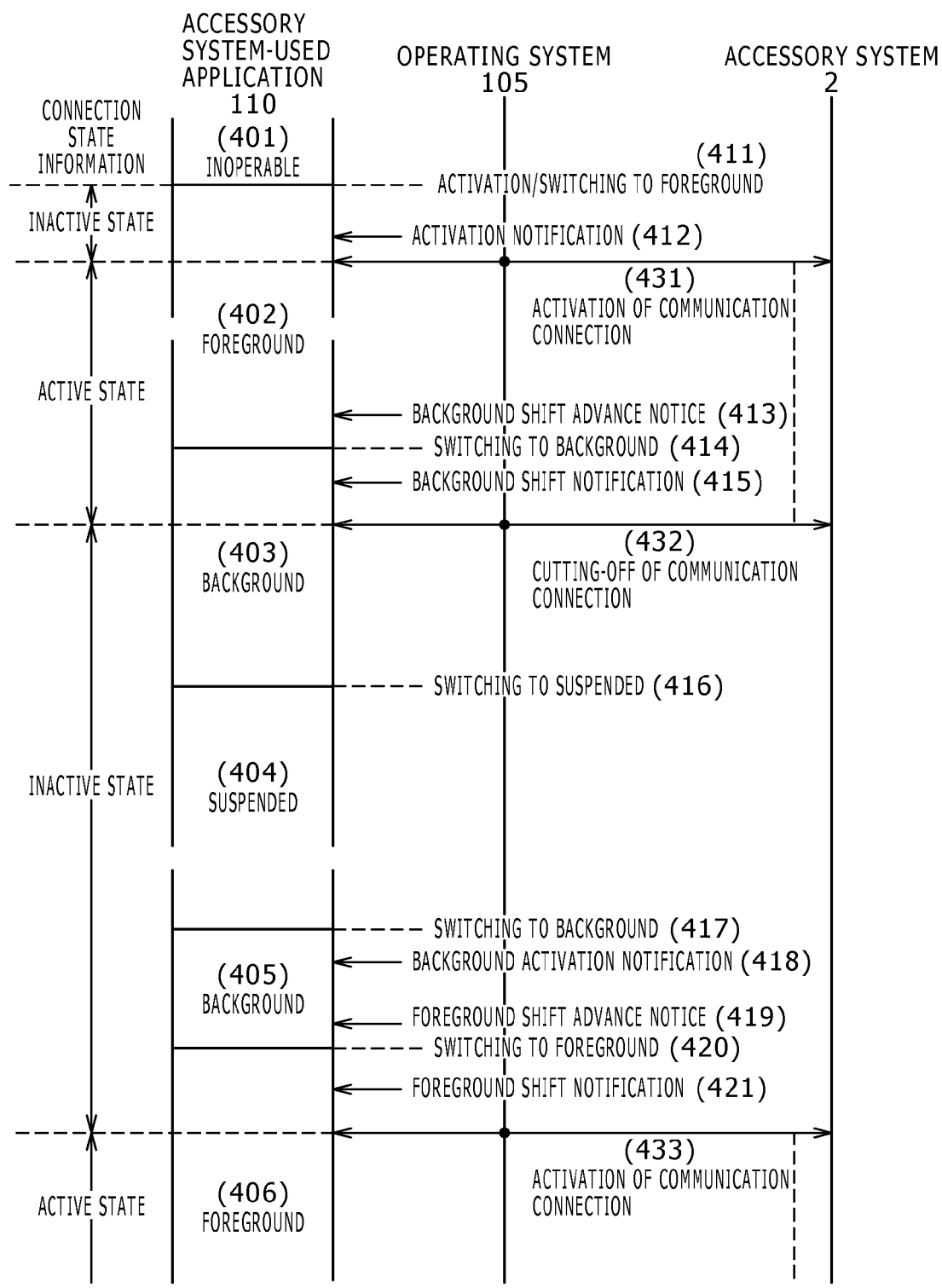
FIG. 4 is a chart showing an example of the operation of the application according to the embodiment of the present invention.

As shown in FIG. 4, when a user instructs to activate an application 110 in an inoperable state (401), the operating system 105 activates the application 110 to shift the application 110 to a foreground state (402) (411). In addition, the operating system 105 provides the application 110 with an activation notification (412).

Next, since the initial value of the state of the communication connection managed as connection state information indicates an inactive state, the application 110 having shifted to the foreground state (402) and having received the activation notification (412) performs the processing of establishing the communication connection between the application 110 and the accessory system 2 via the operating system 105 (431). When the communication connection is established, the application 110 brings the state of the communication connection managed as the connection state information to an active state, and begins predetermined processing using communication with the accessory system 2 via the communication connection.

Note that the communication connection between the accessory system 2 and the application 110 may be established and activated by the operating system 105 and the accessory system 2 in shifting the application 110 to the foreground state. That is, e.g., in shifting the application 110 to the foreground state, the operating system 105 may notify activation of the application 110 to the accessory system 2, and then the communication connection may be established in such a manner that the accessory system 2 having received the activation notification performs, using the operating system 105 and the application 110, the processing of establishing the communication connection between the application 110 and the accessory system 2.

Subsequently, when the operating system 105 switches, depending on, e.g., the user operation, the application 110 targeted for the foreground state from the application 110 having been in the foreground state to another application 110 or controls the mobile system 1 to the sleep state, the operating system 105 first provides the application 110 in the foreground state (402) with the advance notice (413) of shifting the application 110 to the background state. Subsequently, the operating system 105 shifts the application 110 to the background state (403) (414), and then, provides the application 110 with a background shift notification (415).

The application 110 having received the background shift notification (415) performs the background shift preparation processing as described above. Since the state of the communication connection managed at this point is the active state, the communication connection established between the application 110 and the accessory system 2 is cut off via the operating system 105 (432), and then the state of the communication connection managed as the connection state information is switched to the inactive state.

Subsequently, the operating system 105 shifts the application 110 to a suspended state (404) by a predetermined trigger such as a lapse of a predetermined period of time (416). At this point, the operating system 105 does not provide the application 110 with the advance notice of shifting the application 110 to the suspended state prior to shift to the suspended state (404).

When the application 110 is in the suspended state (404), if a request for switching the application 110 to the foreground state is made by, e.g., a user operation, the operating system 105 shifts the application 110 in the suspended state (404) to a background state (405) (417), and then provides the application 110 with a background activation notification (418). After the operating system 105 provides the application 110 in the background state (405) with the advance notice (419) of shifting such an application 110 to the foreground state, the operating system 105 shifts the application 110 to a foreground state (406) (420), and then provides the application 110 with a foreground shift notification (421).

Since the state of the communication connection managed at this point indicates the inactive state, the application 110 having shifted to the foreground state (406) and having received the foreground shift notification (421) performs the processing of establishing the communication connection between the application 110 and the accessory system 2 via the operating system 105 (433). When the communication connection is established, the application 110 brings the state of the communication connection managed as the connection state information to the active state, and begins predetermined processing using communication with the accessory system 2 via the communication connection.

Note that the application 110 also performs predetermined processing depending on notifications when the application 110 receives each type of the foregoing notifications, other than the background shift notification, from the operating system 105. More specifically, the processing defined by the method of the application 110 invoked by the operating system 105 in response to the notification is performed.

An embodiment of the present invention has been described above.

According to the present embodiment, when the application 110 shifts to the background state, the communication connection between the application 110 and the accessory system 2 is surely cut off before the application 110 shifts to the suspended state, and the state of the communication connection indicated by the connection state information is updated to the inactive state. Since the communication connection has been already cut off when the application 110 shifts to the suspended state, the state of the communication connection between the application 110 and the accessory system 2 is not changed during the period of the suspended state. Thus, when the application 110 returns from the suspended state to the foreground state, inconsistency between the state of the communication connection managed as the connection state information and the actual state of the communication connection is reduced.

Figure 5:
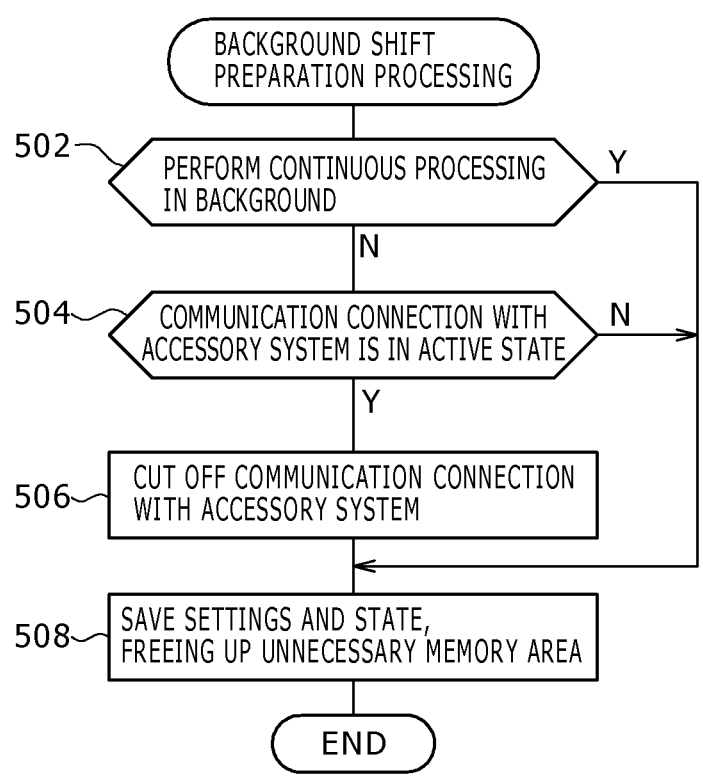
FIG. 5 is a flowchart showing another example of the background shift preparation processing according to the embodiment of the present invention.

In the case of the application 110 for which it is selectively set, depending on an operation state, user settings and the like in the foreground state, whether or not continuous processing is performed in the background state, the background shift preparation processing may be performed as shown in FIG. 5 in the foregoing embodiment. Note that the operating system 105 does not shift the execution state of the application 110, performing continuous processing in the background state, from the background state to the suspended state. Moreover, the application 110 performing continuous processing in the background state can be identified by the operating system 105 in such a manner that the application 110 declares to the operating system 105 that the application 110 itself is the application 110 performing continuous processing in the background state, for example.

In the background shift preparation processing shown in FIG. 5, it is first checked whether or not the application 110 is set to perform continuous processing in the background state (step 502). If the application 110 is set to perform continuous processing in the background state (step 502), the processing of preparing for shift to the background state, such as various settings of the application 110, saving of the state of the application 110, and freeing-up of an unused memory area, is performed (step 508), and then the processing is terminated.

On the other hand, if the application 110 is not set to perform continuous processing in the background state (step 502), it is then checked whether or not the communication connection with the accessory system 2 is in an active state (step 504). If the communication connection with the accessory system 2 is not in the active state (step 504), the processing of preparing for shift to the background state, such as various settings of the application 110, saving of the state of the application 110, and freeing-up of an unused memory area, is performed (step 508), and then the processing is terminated.

On the other hand, if the communication connection with the accessory system 2 is in the active state (step 504), the communication connection with the accessory system 2 is first cut off via the operating system 105 (step 506). Then, the processing of preparing for shift to the background state, such as various settings of the application 110, saving of the state of the application 110, and freeing-up of an unused memory area, is performed (step 508), and then the processing is terminated.

Since the background shift preparation processing is performed as shown in FIG. 5, the communication connection between the application 110 and the external device can be cut off only in the case where there is a possibility that the application 110 shifts to the suspended state so as not to continuously operate in the background state, i.e., the case where there is a possibility that inconsistency between the state of the communication connection managed as the connection state information and the actual state of the communication connection occurs if the communication connection between the application 110 and the accessory system 2 is not cut off.

While there has been illustrated and described what is at present contemplated to be preferred embodiments of the present invention, it will be understood by those skilled in the art that various changes and modifications may be made, and equivalents may be substituted for elements thereof without departing from the true scope of the invention. In addition, many modifications may be made to adapt a particular situation to the teachings of the invention without departing from the central scope thereof. Therefore, it is intended that this invention not be limited to the particular embodiments disclosed, but that the invention will include all embodiments falling within the scope of the appended claims.

What is claimed is:

1. A non-transitory storage medium storing a computer program read and executed by a computer including an operating system, wherein
the computer causes the computer program to function as an application running on the operating system,
while the application is running, the operating system controls and shifts an execution state of the application among a foreground state in which the application is executed in a foreground and can communicate with an external device using a communication connection, a background state in which the application is executed in a background and can communicate with an external device using a communication connection, and a suspended state in which the application is inexecutable, and
the application includes
a communication connection-used processor configured to, when the execution state of the application is the foreground state, perform processing using a communication connection established between the application and an external device,
a communication connection manager configured to save connection state information indicating an active or inactive state of the communication connection between the application and the external device and to update the connection state information depending on a change in active or inactive state of the communication connection between the foreground state and the background state of the application, and
a communication connection cutter configured to, in a case where the execution state of the application is the foreground state and the communication connection between the application and the external device is in the active state, cut off, via the operating system, the communication connection when the execution state of the application shifts to the background state and before the execution state of the application shifts to the suspended state, whereupon the communication connection manager updates the connection state information for the application from the active state to the inactive state, and if the application is subsequently shifted to the suspended state, the connection state information for the application continues to indicate the inactive state.

2. The non-transitory storage medium storing a computer program of claim 1, wherein
the application further includes a continuous operation setter configured to selectively set whether or not continuous operation is performed in the background state, and
when the execution state shifts to the background state,
if it is set that the application performs the continuous operation in the background state, the communication connection cutter of the application does not cut off the communication connection even in the case where the communication connection between the application and the external device is in the active state, and
only if it is set that the application does not perform the continuous operation in the background state, and the communication connection between the application and the external device is in the active state, the communication connection cutter of the application cuts off the communication connection.

3. The non-transitory storage medium storing a computer program of claim 1, wherein
the application further includes a communication connection activator configured to, in a case where the communication connection between the application and the external device is in the inactive state, activate the communication connection between the application and the external device when the execution state shifts to the foreground state.

4. The non-transitory storage medium storing a computer program of claim 2, wherein
the application further includes a communication connection activator configured to, in a case where the communication connection between the application and the external device is in the inactive state, activate the communication connection between the application and the external device when the execution state shifts to the foreground state.

5. An information processing system connectable to an external device, comprising:
an operating system implemented by a computer executing a stored computer program; and
an application implemented by a computer executing a stored computer program and running on the operating system,
wherein while the application is running, the operating system controls and shifts an execution state of the application among a foreground state in which the application is executed in a foreground and can communicate with an external device using a communication connection, a background state in which the application is executed in a background and can communicate with an external device using a communication connection, and a suspended state in which the application is inexecutable, and
the application includes
a communication connection-used processor configured to, when the execution state of the application is the foreground state, perform processing using a communication connection established between the application and the external device,
a communication connection manager configured to save connection state information indicating an active or inactive state of the communication connection between the application and the external device and to update the connection state information depending on a change in active or inactive state of the communication connection between the foreground state and the background state of the application, and
a communication connection cutter configured to, in a case where the execution state of the application is the foreground state and the communication connection between the application and the external device is in the active state, cut off, via the operating system the communication connection when the execution state of the application shifts to the background state and before the execution state of the application shifts to the suspended state, whereupon the communication connection manager updates the connection state information for the application from the active state to the inactive state, and if the application is subsequently shifted to the suspended state, the connection state information for the application continues to indicate the inactive state.

6. The information processing system of claim 5, wherein the application further includes a continuous operation setter configured to selectively set whether or not continuous operation is performed in the background state, and when the execution state shifts to the background state,
if it is set that the application performs the continuous operation in the background state, the communication connection cutter of the application does not cut off the communication connection even in the case where the communication connection between the application and the external device is in the active state, and
only if it is set that the application does not perform the continuous operation in the background state, and the communication connection between the application and the external device is in the active state, the communication connection cutter of the application cuts off the communication connection.

7. The information processing system of claim 5, wherein the application further includes a communication connection activator configured to, in a case where the connection state information indicates that the communication connection between the application and the external device is in the inactive state, activate the communication connection between the application and the external device when the execution state shifts to the foreground state.

8. The information processing system of claim 6, wherein the application further includes a communication connection activator configured to, in a case where the connection state information indicates that the communication connection between the application and the external device is in the inactive state, activate the communication connection between the application and the external device when the execution state shifts to the foreground state.

9. A method for performing processing by an application running on an operating system of a computer,
in which the operating system controls and shifts, while the application is running, an execution state of the application among a foreground state in which the application is executed in a foreground and can communicate with an external device using a communication connection, a background state in which the application is executed in a background and can communicate with an external device using a communication connection, and a suspended state in which the application is inexecutable,
the method for performing processing comprising:
a communication connection-used processing step of, when the execution state of the application is the foreground state, performing processing using a communication connection established between the application and an external device;
a connection state information management step of saving connection state information indicating an active or inactive state of the communication connection between the application and the external device and updating the connection state information depending on a change in active or inactive state of the communication connection between the foreground state and the background state of the application; and
a communication connection cutting step of, in a case where the execution state of the application is the foreground state and the communication connection between the application and the external device is in the active state, cutting off, via the operating system, the communication connection when the execution state of the application shifts to the background state and before the execution state of the application shifts to the suspended state, whereupon the connection state information management step further comprises updating the connection state information for the application from the active state to the inactive state, and if the application is subsequently shifted to the suspended state, the connection state information for the application continues to indicate the inactive state.

10. The method for performing processing of claim 9, further comprising:
a step of selectively setting whether or not continuous operation is performed in the background state,
wherein the communication connection cutting step is a step of, when the execution state shifts to the background state,
if it is set that the application performs the continuous operation in the background state, not cutting off the communication connection even in the case where the communication connection between the application and the external device is in the active state, and
only if it is set that the application does not perform the continuous operation in the background state, and the communication connection between the application and the external device is in the active state, cutting off the communication connection.

11. The method for performing processing of claim 9, further comprising:
a communication connection activation step of, in a case where the connection state information indicates that the communication connection between the application and the external device is in the inactive state, activating the communication connection between the application and the external device when the execution state shifts to the foreground state.

12. The method for performing processing of claim 10, further comprising:
a communication connection activation step of, in a case where the connection state information indicates that the communication connection between the application and the external device is in the inactive state, activating the communication connection between the application and the external device when the execution state shifts to the foreground state.

* * * * *